US006324395B1

(12) United States Patent
Khayrallah et al.

(10) Patent No.: US 6,324,395 B1
(45) Date of Patent: *Nov. 27, 2001

(54) APPARATUS AND METHODS FOR ASSIGNING SPECTRAL AND NON-SPECTRAL RESOURCE CHARGES IN WIRELESS COMMUNICATIONS SYSTEMS

(75) Inventors: Ali S. Khayrallah, Apex; David R. Irvin, Raleigh, both of NC (US)

(73) Assignee: Ericsson Inc., Research Triangle Park, NC (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/195,315

(22) Filed: Nov. 18, 1998

(51) Int. Cl.[7] .......................... H04M 11/00; H04Q 7/20
(52) U.S. Cl. ................................. 455/406; 455/445
(58) Field of Search ................................. 455/406, 452, 455/450, 509, 510, 445, 405, 408, 403, 422; 379/114.05, 114.06, 114.07

(56) References Cited

U.S. PATENT DOCUMENTS

| | | | | |
|---|---|---|---|---|
| 4,447,903 | | 5/1984 | Sewerinson | 371/68 |
| 4,495,619 | | 1/1985 | Acampora | 370/104 |
| 4,868,758 | * | 9/1989 | Kokubu | 705/400 |
| 5,065,393 | * | 11/1991 | Sibbitt et al. | 370/360 |
| 5,204,874 | | 4/1993 | Falconer et al. | 375/200 |
| 5,303,297 | * | 4/1994 | Hillis | 455/406 |
| 5,313,653 | * | 5/1994 | Sasuta | 455/17 |
| 5,341,401 | | 8/1994 | Farjh et al. | 375/94 |
| 5,450,453 | | 9/1995 | Frank | 375/200 |
| 5,465,398 | | 11/1995 | Flammer | 455/69 |

(List continued on next page.)

FOREIGN PATENT DOCUMENTS

| | | |
|---|---|---|
| 0 817 397 A1 | 1/1998 | (EP) . |
| 0 838 964 A2 | 4/1998 | (EP) . |
| WO 98/31165 | 7/1998 | (WO) . |
| WO 98/33346 | 7/1998 | (WO) . |

OTHER PUBLICATIONS

Matthews, Adrian, "Application of IS–136 to Personal Communication Services," IEEE Publication Date: Apr. 30, 1996, pp. 223–228.
International Search Report, PCT/US00/07105, Jul. 6, 2000.
International Search Report, PCT/US00/08279, Aug. 1, 2000.
International Search Report, PCT/US99/21463, Feb. 21, 2000.
W.T. Webb, "QAM: the modulation scheme for future mobile radio communications?," Electronics & Communication Engineering Journal, Aug. 1992, pp. 167–176.
Giuliano Benelli, "Two New Coding Techniques for Diversity Communication Systems," IEEE Transactions on Communications, Sep. 1990, No. 9, New York, US, pp. 1530–1538.
International Search Report, PCT/US99/21128, Jan. 17, 2000.

*Primary Examiner*—Vivian Chang
*Assistant Examiner*—Charles N. Appiah
(74) *Attorney, Agent, or Firm*—Myers Bigel Sibley & Sajovec

(57) ABSTRACT

Charge for communication of a message in a wireless communications system is assigned commensurate with the spectral and non-spectral resource demand associated with the service used to communicate the message. A service may be identified from a plurality of services in response to a user request to communicate a message, for example, and charge for the communication of the message assigned to the user based on the service identified. According to another aspect, the system may first determine whether sufficient system resources are available to communicate the message using the selected service. According to another aspect, the system may first determine whether the user is authorized to communicate the message using the selected service.

22 Claims, 10 Drawing Sheets

U.S. PATENT DOCUMENTS

| | | | |
|---|---|---|---|
| 5,608,446 | * | 3/1997 | Carr et al. .................................. 348/6 |
| 5,612,948 | | 3/1997 | Fette et al. ............................. 379/252 |
| 5,621,737 | | 4/1997 | Bucher .................................. 371/5.1 |
| 5,625,877 | * | 4/1997 | Dunn et al. ............................ 455/454 |
| 5,657,325 | | 8/1997 | Lou et al. .............................. 370/344 |
| 5,664,006 | * | 9/1997 | Monte et al. .......................... 455/405 |
| 5,666,649 | * | 9/1997 | Dent ...................................... 455/445 |
| 5,751,799 | * | 5/1998 | Mori ...................................... 379/114 |
| 5,754,599 | | 5/1998 | Ling et al. ............................. 375/340 |
| 5,828,737 | * | 10/1998 | Sawyer .................................. 379/114 |
| 5,884,170 | | 3/1999 | Valentine et al. ..................... 455/433 |
| 5,898,736 | | 4/1999 | Saito et al. ............................ 375/316 |
| 5,909,434 | | 6/1999 | Odenwalder et al. ................ 370/342 |
| 5,946,356 | | 8/1999 | Felix ...................................... 375/295 |
| 5,946,670 | * | 8/1999 | Motohashi et al. ................... 705/400 |
| 5,966,384 | | 10/1999 | Felix et al. ............................ 370/465 |
| 5,987,076 | | 11/1999 | Zehavi et al. ......................... 375/340 |
| 6,097,937 | * | 8/2000 | Sawyer .................................. 455/406 |
| 6,148,208 | | 11/2000 | Love ...................................... 455/442 |
| 6,154,643 | * | 11/2000 | Cox ....................................... 455/406 |
| 6,188,885 | | 2/2001 | Kolev et al. ........................... 455/413 |

\* cited by examiner

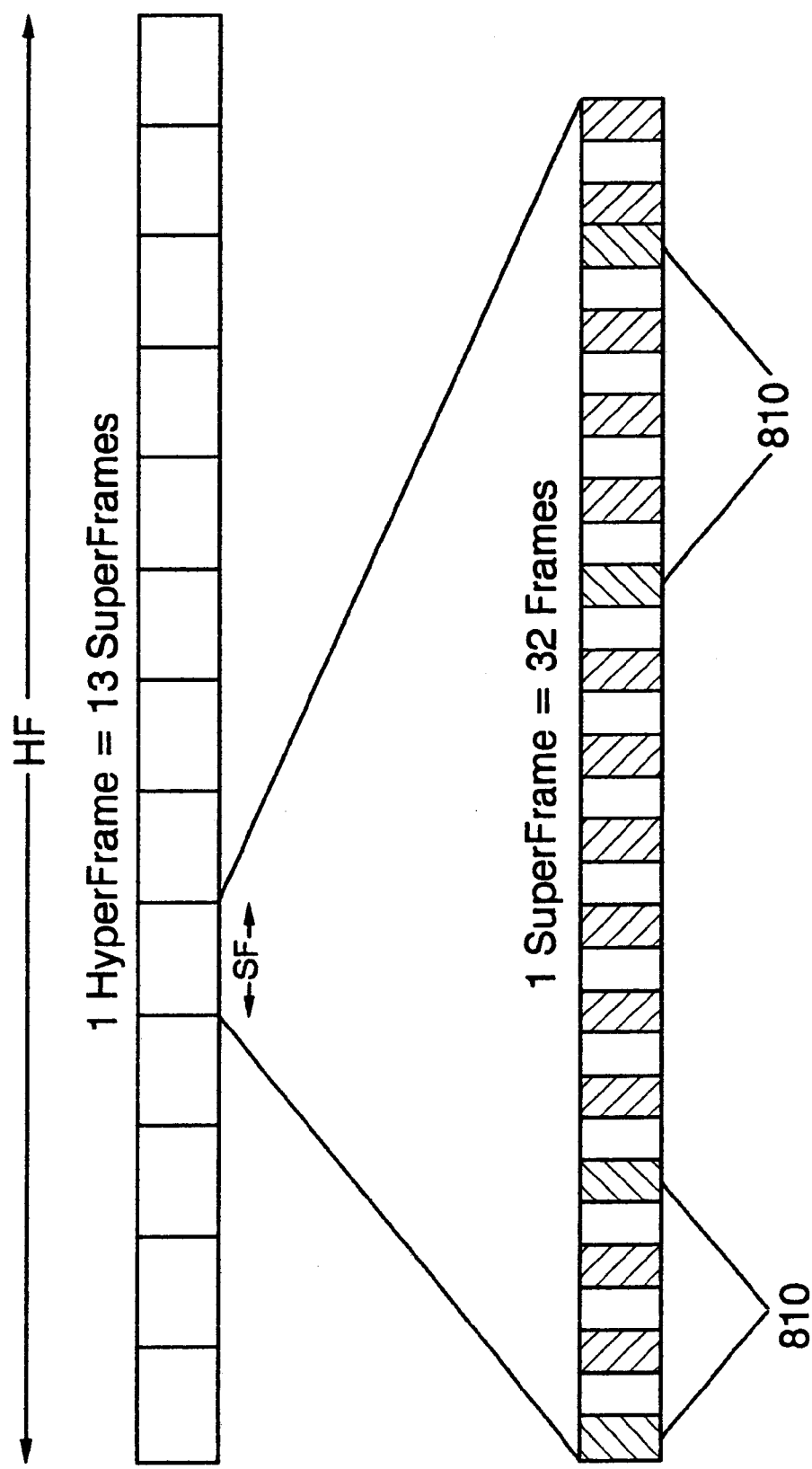

APPARATUS AND METHODS FOR ASSIGNING SPECTRAL AND NON-SPECTRAL RESOURCE CHARGES IN WIRELESS COMMUNICATIONS SYSTEMS

FIELD OF THE INVENTION

The present invention relates to communications systems and methods, and more particularly, to wireless communications systems and methods.

BACKGROUND OF THE INVENTION

Wireless communications systems are commonly employed to provide voice and data communications to subscribers. For example, analog cellular radiotelephone systems, such as those designated AMPS, ETACS, NMT-450, and NMT-900, have been long been deployed successfully throughout the world. Digital cellular radiotelephone systems such as those conforming to the North American standard IS-54 and the European standard GSM have been in service since the early 1990's. More recently, a wide variety of wireless digital services broadly labeled as PCS (Personal Communications Services) have been introduced, including advanced digital cellular systems conforming to standards such as IS-136 and IS-95, lower-power systems such as DECT (Digital Enhanced Cordless Telephone) and data communications services such as CDPD (Cellular Digital Packet Data). These and other systems are described in *The Mobile Communications Handbook*, edited by Gibson and published by CRC Press (1996).

FIG. 1 illustrates a typical terrestrial cellular radiotelephone communication system 20. The cellular radiotelephone system 20 may include one or more radiotelephones (terminals) 22, communicating with a plurality of cells 24 served by base stations 26 and a mobile telephone switching office (MTSO) 28. Although only three cells 24 are shown in FIG. 1, a typical cellular network may include hundreds of cells, may include more than one MTSO, and may serve thousands of radiotelephones.

The cells 24 generally serve as nodes in the communication system 20, from which links are established between radiotelephones 22 and the MTSO 28, by way of the base stations 26 serving the cells 24. Each cell 24 will have allocated to it one or more dedicated control channels and one or more traffic channels. A control channel is a dedicated channel used for transmitting cell identification and paging information. The traffic channels carry the voice and data information. Through the cellular network 20, a duplex radio communication link may be effected between two mobile terminals 22 or between a mobile terminal 22 and a landline telephone user 32 through a public switched telephone network (PSTN) 34. The function of a base station 26 is to handle radio communication between a cell 24 and mobile terminals 22. In this capacity, a base station 26 functions as a relay station for data and voice signals.

As illustrated in FIG. 2, a satellite 42 may be employed to perform similar functions to those performed by a conventional terrestrial base station, for example, to serve areas in which population is sparsely distributed or which have rugged topography that tends to make conventional landline telephone or terrestrial cellular telephone infrastructure technically or economically impractical. A satellite radiotelephone system 40 typically includes one or more satellites 42 that serve as relays or transponders between one or more earth stations 44 and terminals 23. The satellite conveys radiotelephone communications over duplex links 46 to terminals 23 and an earth station 44. The earth station 44 may in turn be connected to a public switched telephone network 34, allowing communications between satellite radiotelephones, and communications between satellite radio telephones and conventional terrestrial cellular radiotelephones or landline telephones. The satellite radiotelephone system 40 may utilize a single antenna beam covering the entire area served by the system, or, as shown, the satellite may be designed such that it produces multiple minimally-overlapping beams 48, each serving distinct geographical coverage areas 50 in the system's service region. The coverage areas 50 serve a similar function to the cells 24 of the terrestrial cellular system 20 of FIG. 1.

Traditional analog cellular systems generally employ a system referred to as frequency division multiple access (FDMA) to create communications channels. As a practical matter well known to those skilled in the art, radiotelephone communications signals, being modulated waveforms, typically are communicated over predetermined frequency bands in a spectrum of carrier frequencies. In a typical FDMA system, each of these discrete frequency bands serves as a channel over which cellular radiotelephones communicate with a cell, through the base station or satellite serving the cell.

The limitations on the available frequency spectrum presents several challenges as the number of subscribers increases. Increasing the number of subscribers in a cellular radiotelephone system requires more efficient utilization of the limited available frequency spectrum in order to provide more total channels while maintaining communications quality. This challenge is heightened because subscribers may not be uniformly distributed among cells in the system. More channels may be needed for particular cells to handle potentially higher local subscriber densities at any given time. For example, a cell in an urban area might conceivably contain hundreds or thousands of subscribers at any one time, easily exhausting the number of channels available in the cell.

For these reasons, conventional cellular systems employ frequency reuse to increase potential channel capacity in each cell and increase spectral efficiency. Frequency reuse involves allocating frequency bands to each cell, with cells employing the same frequencies geographically separated to allow radiotelephones in different cells to simultaneously use the same frequency without interfering with each other. By so doing, many thousands of subscribers may be served by a system of only several hundred frequency bands.

Another technique which can further increase channel capacity and spectral efficiency is the use of time division multiple access (TDMA). A TDMA system may be implemented by subdividing the frequency bands employed in conventional FDMA systems into sequential time slots. Communication over a frequency band typically occur on a repetitive TDMA frame structure that includes a plurality of time slots. Examples of systems employing TDMA are those conforming to the dual analog/digital IS-54B standard employed in the United States, in which each of the frequency bands of the traditional analog cellular spectrum are subdivided into 3 time slots, and systems conforming to the GSM standard, which divides each of a plurality of frequency bands into 8 time slots. In these TDMA systems, each user communicates with the base station using bursts of digital data transmitted during the user's assigned time slots.

A channel in a TDMA system typically includes at least one time slot on at least one frequency band. As discussed above, channels are used to communicate voice, data or other information between users, for example, between a radiotelephone and a landline telephone. Channels may be assigned to predetermined slots of predetermined frequency bands, as in the case of dedicated control channels. Included in the typical set of dedicated control channels transmitted in a cell are forward control channels which are used to broadcast control information in a cell of the radiotelephone system to radiotelephones which may seek to access the system. The control information broadcast on a forward control channel may include such things as the cell's identification, an associated network identification, system timing information and other information needed to access the radiotelephone system from a radiotelephone.

Channels in a TDMA system may also be dynamically assigned by the system when and where needed. In addition, some systems, such as those conforming to the GSM standard, "frequency hop" traffic channels, i.e., change the frequency band on which a particular traffic channel is transmitted on a frame-by-frame basis. Frequency hopping can reduce the probability of interference events between channels, by reducing the likelihood that the same two stations will use the same frequency at the same time. This can help provide for communications quality related to average instead of worst case interference.

Instead of or in addition to FDMA and TDMA techniques, wireless communications systems may employ Code Division Multiple Access (CDMA) or "spread spectrum" techniques. In a CDMA system, a channel is defined by modulating a data-modulated carrier signal by a unique spreading code, i.e., a code that spreads an original data-modulated carrier over a wide portion of the frequency spectrum in which the communications system operates. The transmitted signal is demodulated by a receiver unit using the same spreading code using signal correlation techniques. Because the transmitted signal is spread across a wide bandwidth, CDMA communications can be less vulnerable to coherent noise sources which might "jam" other communications signals. The use of the unique spreading code allows several channels to effectively share the same bandwidth.

The quality of service provided by a wireless communications systems such as cellular systems is subject to environmental effects. For example, a cellular radiotelephone call placed under system operating parameters designed to produce an acceptable level of communications quality under a set of nominal environmental conditions can be disrupted by fading, shadowing by intervening objects such as hills, and attenuation by distance and by structures such as buildings. Such environmental factors can result in service outages.

An example of such a service disruption occurs when a mobile radiotelephone enters an outage region of a cellular radiotelephone system. Such a region might include a hole in cellular coverage between cells, or an area of degraded reception or transmission within a cell, such as the interior of a building or a tunnel. When the mobile radiotelephone enters such a disadvantaged location, it may be unable to continue a call in progress, to receive notification of an incoming call, or to place an outgoing call.

A wireless communications system can be designed to reduce service disruptions in many ways. Improved service to subscriber units in disadvantaged locations can be achieved by providing a selective high-power paging system that can contact such units of an incoming call. In such a system, a base station sends a paging message to a disadvantaged unit over a specially-designated high power channel. The paged unit can then moved to a less disadvantaged location in order to answer the page.

Conventional system operating techniques may fail to accurately apportion costs associated with particular services. Each user is typically billed according to minutes of use, which can result in a cross subsidy flowing to users of specialized service that may require increase bandwidth, transmit power, or system infrastructure.

SUMMARY OF THE INVENTION

In light of the foregoing, it is an object of the present invention to provide wireless communications systems and methods that more accurately apportion system usage costs across a subscriber base.

This and other objects, features and advantages are provided according to the present invention by wireless communications apparatus and methods in which charge for the communication of a message in a wireless communications system is assigned commensurate with the spectral and non-spectral resource demand associated with the service used to communicate the message. A service may be identified from a plurality of services in response to a user request to communicate a message, for example, and charge for the communication of the message assigned to the user based on the service identified. According to another aspect of the present invention, the system may first determine whether sufficient system resources are available to communicate the message using the selected service. According to another aspect of the present invention, the system may first determine whether the user is authorized to communicate the message using the selected service.

Apparatus and methods according to the present invention can provide a more accurate and equitable apportionment of operating costs. By tying tariffs to the type of service used to communicate a message, both directly measurable cost indices such as power usage and bandwidth usage can be commensurately billed, as well as indirect costs attributable to the more complex and expensive equipment need to provide certain types of premium or robust services.

In particular, according to the present invention, a service of a plurality of services offered by a wireless communications system is identified, for example, in response to a user request. A respective one of the plurality of services has a respective spectral demand and a respective non-spectral demand associated therewith, for example, "normal" services, "robust" services which provide increased redundancy at the same level of spectral resource use as the "normal" services but with increased non-spectral resource demand, and "premium" services which provide increased power or bandwidth with commensurate increased spectral demand. A message is communicated according to the identified service. A charge for communication of the message is assigned according to the identified service commensurate with at least one of the spectral demand and the non-spectral demand associated therewith.

According to an aspect of the present invention, prior to communication of the message, a determination is made if system resources sufficient to meet the spectral demand and the non-spectral demand associated with the identified service are present. The message is communicated according to the identified service if sufficient system resources are present. According to another aspect, the message is communicated according to the identified service based on a prior determination if use of the service is authorized. According to yet another aspect, assignment of a charge is preceded by the step of identifying a tariff associated with the identified service. A charge for the communication is then assigned according to the identified tariff.

In an embodiment of the present invention, an apparatus is provided in a wireless communications system, the apparatus including means for identifying a service of a plurality of services offered by the wireless communications system, a respective one of the plurality of services having a respective spectral demand and a respective non-spectral demand associated therewith. Means are provided, responsive to said means for identifying, communicate a message according to the identified service. Means are also provided, responsive to said means for communicating, for assigning a charge for communication of the message according to the identified service commensurate with at least one of the spectral demand and the non-spectral demand associated therewith. Improved apportionment of communications charges may thereby be provided.

BRIEF DESCRIPTION OF THE DRAWINGS

FIG. 8 illustrates an exemplary frame structure for a high penetration messaging channel.

DETAILED DESCRIPTION OF EMBODIMENTS

Figure 1:
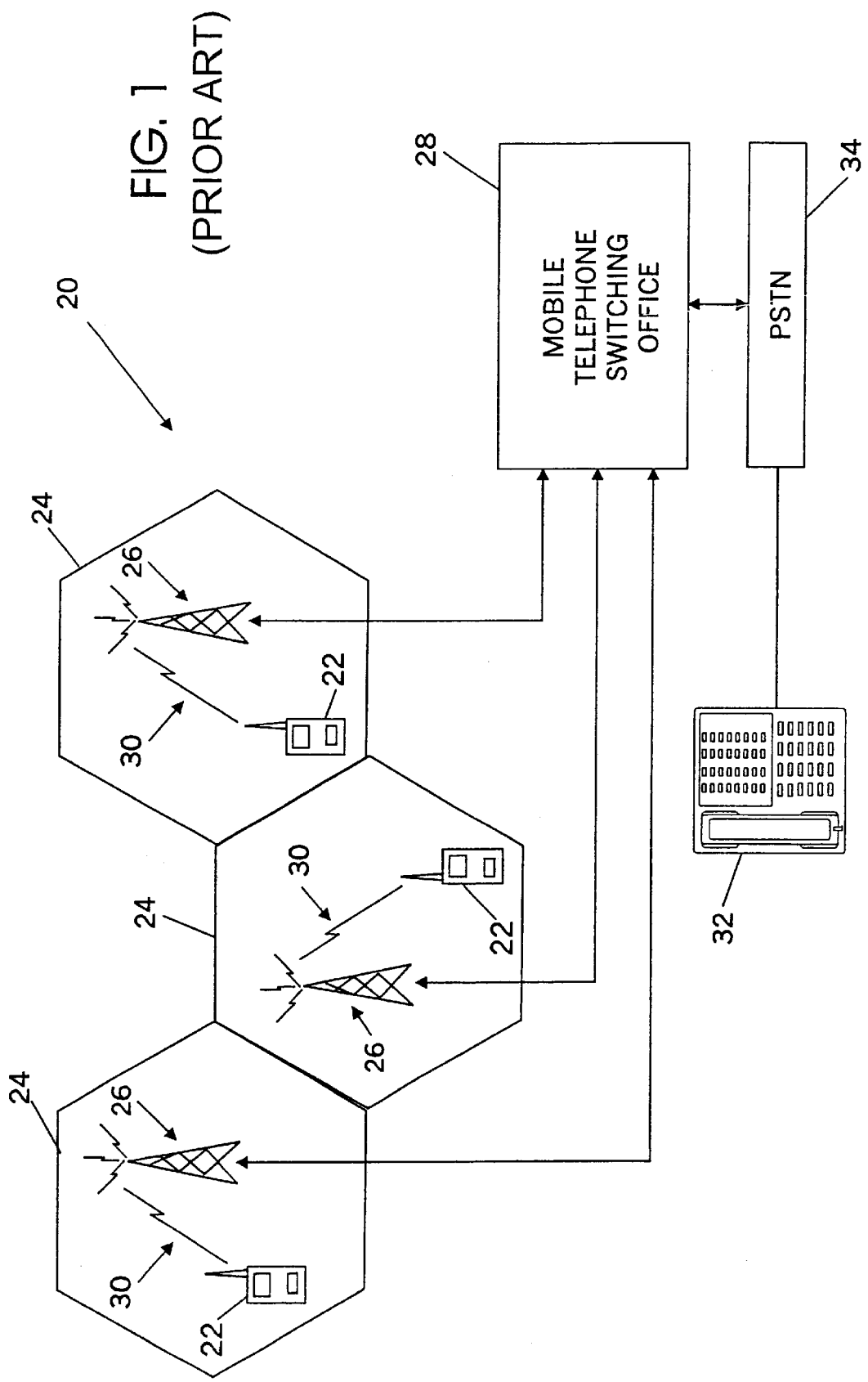
FIG. 1 illustrates a conventional terrestrial cellular radiotelephone communications system.

The present invention now will be described more fully hereinafter with reference to the accompanying drawings, in which embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

The present invention relates to communication over channels in wireless communications systems such as cellular radiotelephone systems. As those skilled in the art will appreciate, terms such as "channel" are not always consistently used in the literature; for example, the *IEEE Standard Dictionary of Electrical Terms* defines a "channel" as both a communications path and a band of frequencies. In a conventional FDMA system, for example, a "channel" may refer or corresponds to a "physical" channel comprising a band of frequencies occupied by a modulated carrier. In a TDMA system such as GSM, a physical channel may comprise a group of time slots on one or more frequency bands, for example, the periodic time slots on particular frequency bands that are allocated to the so-called "common channels." In some contexts, a channel may be a "logical channel" defined by an addressing or field assignment scheme that may have no particular correlation to the frequency or time of transmission. For purposes of the present application, "channel" refers to a communications path defined in a communications interface such as the air interface of a wireless communications system, whether it be an actual physical channel comprising a frequency band, a time slice thereof, or the like, or a logical channel carried by such a physical channel.

"Frequency band" as used herein refers to a frequency range over which a communications signal, e.g., a modulated carrier signal, is distributed. This band may be, but need not necessarily be, centered about a central carrier frequency. Those skilled in the art will appreciate that the carrier frequency bands described herein need not be non-overlapping or contiguous; for example, modulated carriers typically may overlap in their spectral distributions without producing unacceptable levels of interference. In fact, in some systems the overlap may be sizable.

The embodiments discussed herein relate to a wireless communications system in which "short messages," e.g., alphanumeric messages such as those conforming to standards such a GSM or IS-136, are transmitted on at least one of a "normal" communications channel having a first channel coding that produces a first redundancy level or a "high penetration" communications channel having a second channel coding that produces a second redundancy level that is greater than the first redundancy level. In this manner, a system with "regular" and "robust" service capabilities can be implemented.

Those skilled in the art will appreciate, however, that the apparatus and methods of the present invention are also applicable to wireless communications systems that provide other types of "premium" services, such as services using high-power and/or high-bandwidth channels for increase fidelity and/or reliability. In general, these robust and premium services can be used for the communication of short messages, control messages, voice and/or data.

An Exemplary Wireless Communications System with a Robust High-Penetration Messaging Capability The following discussion describes exemplary wireless communications systems with both "standard," "robust," and "premium" service capabilities. Examples of such systems include wireless communication systems that provide for robust service using higher-redundancy alternative channels as described, for example, in related United States Patent Applications entitled "Wireless Communications Systems with Standard and Robust Services and Methods of Operation Therefor," and "Apparatus and Methods for Providing High-Penetration Messaging in Wireless Communications Systems," both of which are assigned to the assignee of the present invention, filed concurrently herewith and incorporated by reference herein as if the text is physically present. Exemplary wireless communication systems that provide both standard services and high-power premium services are described in a U.S. patent application Ser. No. 08/719,282, filed Sep. 24, 1996, assigned to the assignee of the present invention, and incorporated herein by reference in its entirety as if the text is physically present.

The embodiments described hereafter relate to wireless communications systems in which messages may be communicated over a standard messaging channel, e.g., the standard short message service provided via the Digital Control Channel (DCCH) specified in the IS-136 standard, or over a high-penetration messaging channel that uses substantially the same bandwidth but provides higher redundancy through increased block coding. These embodiments are described illustrate an exemplary environment in which the apparatus and methods of the present invention may be practiced. Those skilled in the art will appreciate that other types of multi-service capable wireless communications systems may also be used with the present invention, such as systems offering either standard and "premium" services as described above, or systems offering a combination of standard, robust and premium services.

Figure 3:
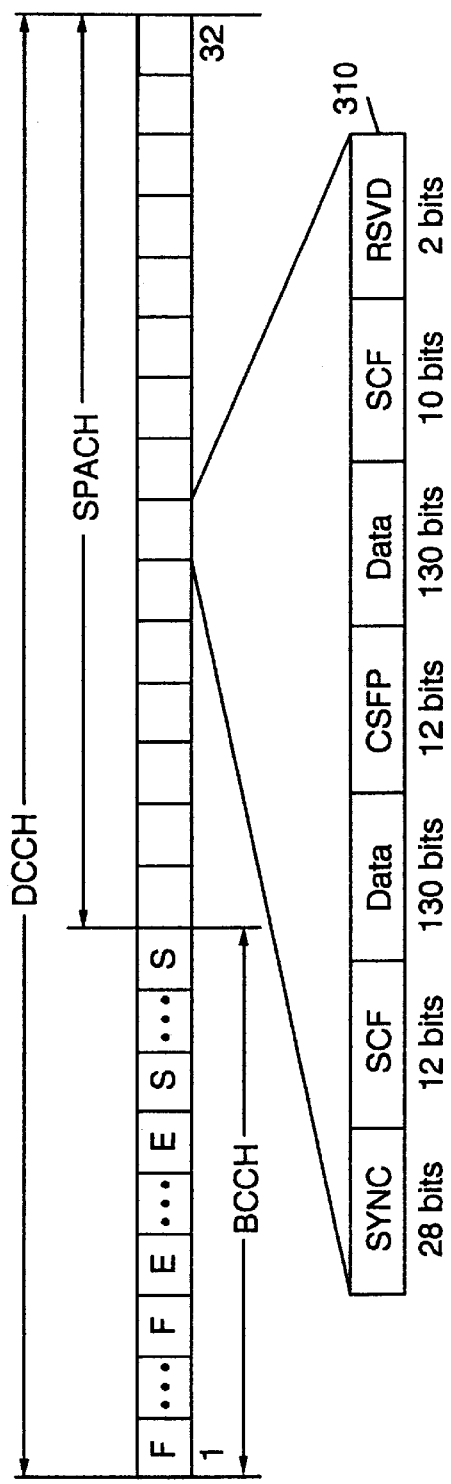
FIG. 3 illustrates a structure for an IS-136 Digital Control Channel (DCCH).

In a wireless communications system conforming to the IS-136 standard, short messages are communicated over a Digital Control Channel (DCCH). FIG. 3 illustrates an IS-136 Digital Control Channel DCCH configuration. The Digital Control Channel DCCH is a "physical channel," that is, an actual portion of a signal propagation resource defined in terms of frequency and time divisions. Several "logical" channels are mapped onto the Digital Control Channel DCCH. These logical channels include a multiplexed Broadcast Channel BCCH designed to convey information about system configuration and system access rules, and a multiplexed point-to-point short message service (SMS), paging and access response channel SPACH.

The Broadcast Channel BCCH is further divided into logical channels. These logical channels include a Fast Broadcast Channel (F-BCCH) F for conveying time-critical information such as system identification (ID) and registration information, an Extended Broadcast Channel (E-BCCH) E for conveying less time critical information such as neighboring cell lists, and an SMS Broadcast Channel (SMS-BCCH) S. The combined SMS, paging and access response channel SPACH comprises a short message service channel (SMSCH) for carrying messages, a paging channel (PCH) for conveying system pages, and an access response channel (ARCH) for providing system response to queries from subscriber units and other administration information.

The slots of each Digital Control Channel DCCH frame start with F-BCCH slots F, followed by E-BCCH slots E, S-BCCH slots S and then the SMS, paging and access slots SPACH. The number of each type of slot in each frame is determined by system setup. As illustrated, each slot 310 of the Digital Control Channel DCCH includes 28 synchronization bits SYNC, 12 Shared Channel Feedback bits SCF bits for supporting a Random Access Channel (RACH), 260 data bits Data, 12 Coded Super Frame Phase bits CSFP for detecting the phase of the Super Frame, and 2 reserved bits RSVD.

A DCCH Super Frame (SF) includes 32 Digital Control Channel DCCH frames. When a subscriber unit such as a mobile radiotelephone first is turned on, the unit's receiver electronics search for a DCCH by reading the CSFP; if the CFSP is changing, the mobile unit has acquired the DCCH. From the CSFP the mobile unit can determine which slot is the first slot in the Super Frame, which allows the unit to then read the F-BCCH. The F-BCCH conveys information regarding the number of F-BCCH, E-BCCH and S-BCCH slots are present in the Super Frame. The mobile unit receives paging group information on the E-BCCH. Once this information is received, the mobile can determine which SPACH slot carries paging and SMS information directed to it. The mobile unit then reads the identified slot once per Super Frame to monitor for the presence of an incoming page or a short message. This periodic reading allows for the creation of a sleep mode cycle, i.e., the mobile can conserve power during times when it is not required to be actively monitoring for the arrival of a page or short message during its assigned slot.

A Hyper Frame includes two Super Frames, with the second Super Frame of a Hyper Frame being a repeat of the first Super Frame. If a subscriber unit is unable to read its slot in the SPACH in the first Super Frame of a Hyper Frame, it can attempt to read it again during the second Super Frame. If the subscriber unit is able to read its assigned SPACH slot in the first Super Frame, however, it can skip reading the second Super Frame.

Figure 4:
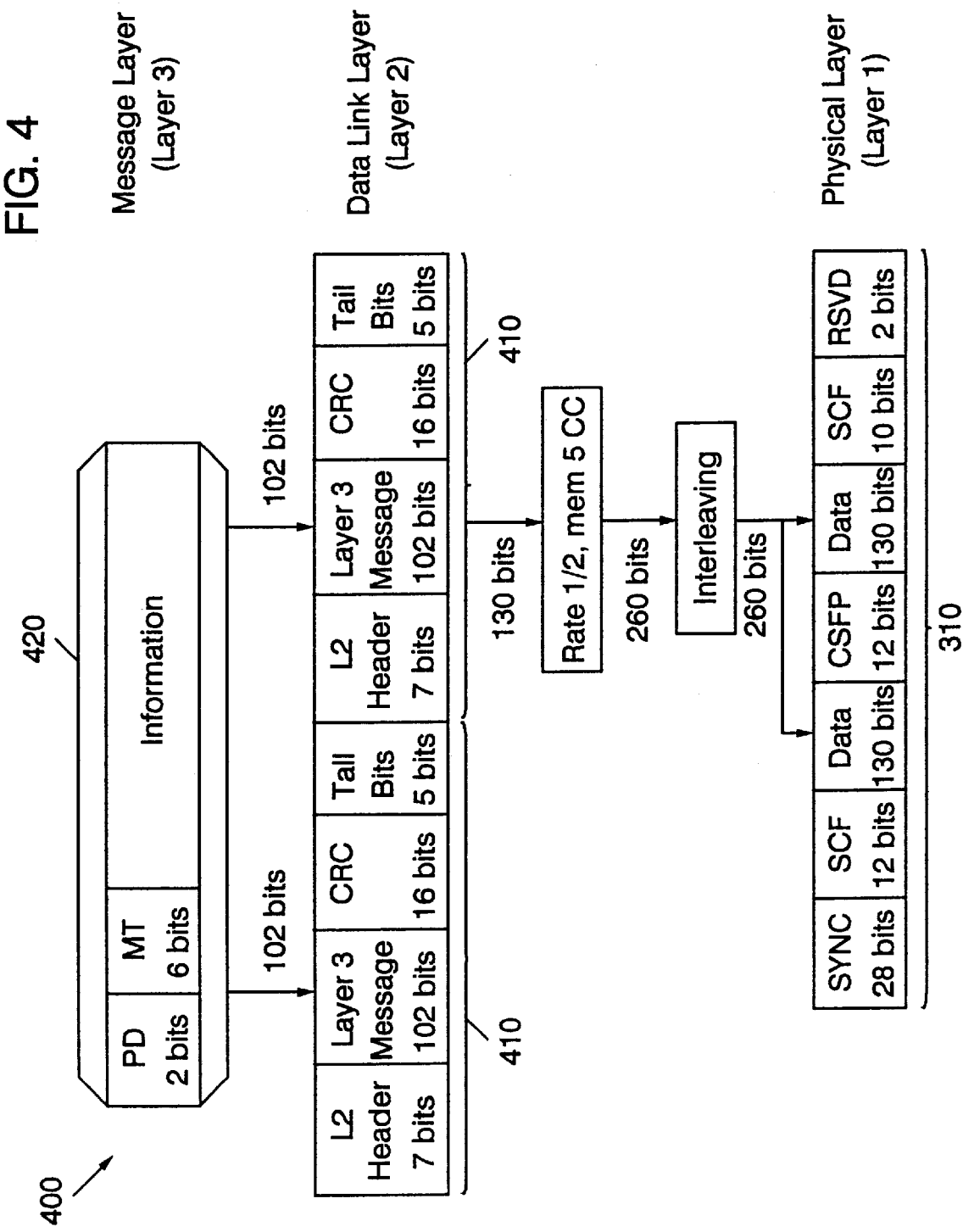
FIG. 4 illustrates a protocol stack for generating an IS-136 DCCH.

FIG. 4 illustrates a protocol stack 400 for generating a DCCH. A Data Link Layer (Layer 2) frame 410 includes a 7-bit header, 102 message bits, a 16-bit cyclic redundancy check (CRC) value, and 5 tail bits that are used for convolutional coding. The 130 bits of a Data Link Layer frame 410 are encoded according to a rate ½ convolutional code and then interleaved to produce 260 bits, which are then formatted and supplement to form a Physical Layer (Layer 1) slot 310. The Data Link Layer frame 410 is generated from a Message Layer (Layer 3) message 420 that includes a 2-bit protocol discriminator (PD) field and a 6-bit message type (MT) field.

The information in the Message Layer message 420 can be of variable length, depending on the particular message being sent. If the information in a given Message Layer message extends beyond 102 bits, multiple Data Link Layer frames 410 are used to transmit the Message Layer message 420. Accordingly, information in a Message Layer message 420 may be transmitted using a number of Physical Layer slots 310. When information in a Message Layer message extends beyond 102 bits, the message is typically transmitted using every other SPACH slot, with a bit in the header of each Data Link Layer frame 410 being set to a predetermined value to tell units in the particular paging group to look at every other SPACH slot for paging or SMS messages. In this manner, messages can be efficiently transmitted while reducing paging delays to units in other paging groups.

Figure 5A:
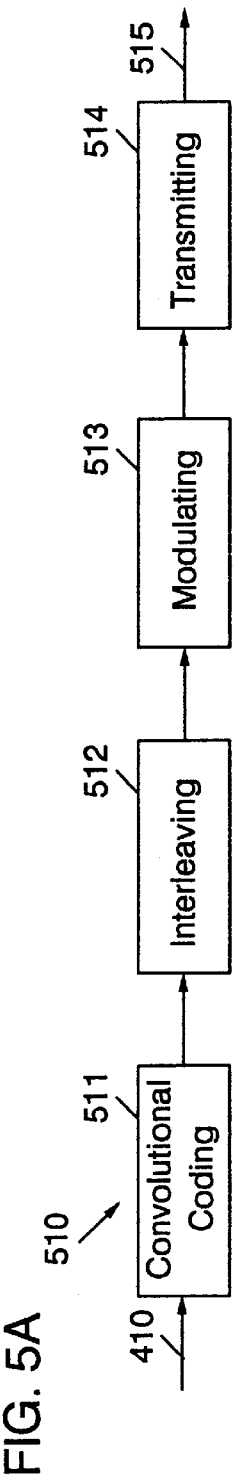
FIGS. 5A–B illustrate respective transmitter and receiver structures for an IS-136 system.
Figure 5B:
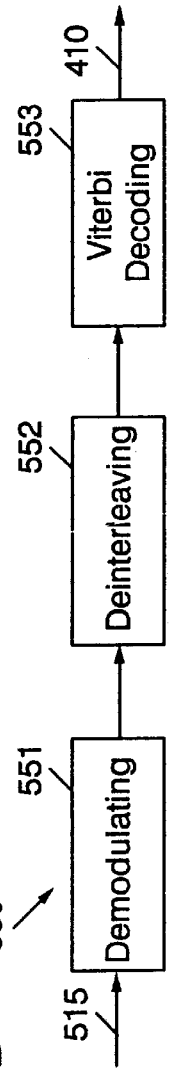

FIGS. 5A and 5B illustrate an exemplary transmitter structure 510 and an exemplary receiver structure 550, respectively, for communicating messages under a conventional standard such as IS-136. Referring to FIG. 5A, a Data Link Layer frame 410 is convolutionally encoded by convolutional coding means 511, with the convolutionally encoded bit stream then being interleaved by interleaving means 512. The encoded and interleaved bits are then modulated by modulating means 513, e.g., a π/4-DQPSK modulator. The output of the modulator 513 is then passed on to transmitting means 514 which transmits a corresponding radio communications signal 515.

Referring to FIG. 5B, the radio communications signal 515 is then received and coherently demodulated by coherent demodulating means 551 to produce a demodulated signal. The demodulated signal is then de-interleaved by de-interleaving means 552 and decoded by Viterbi decoding means 553 to produce a Data Link Layer frame 410' that represents an estimate of the originally transmitted Data Link Layer frame 410.

As illustrated by FIGS. 6A–10, a "high-penetration" messaging service is provided in addition to a conventional messaging service such as that described above to allow communication with a subscriber unit when it is in a disadvantaged location, such as location falling between normal cell coverage regions or a location inside a building or other structure. The high penetration messaging service is provided by using a separate high-penetration channel that utilizes substantially the same transmission rate and power, and thus the substantially the same amount of spectral resource, as the normal messaging channel. The high-penetration channel, however, uses additional coding to provide higher redundancy and which allows the use of non-coherent detection techniques. The additional coding also preferably allows the use of common transmitter elements and receiver elements for both the normal messaging channel and the high-penetration channel.

Figure 6A:
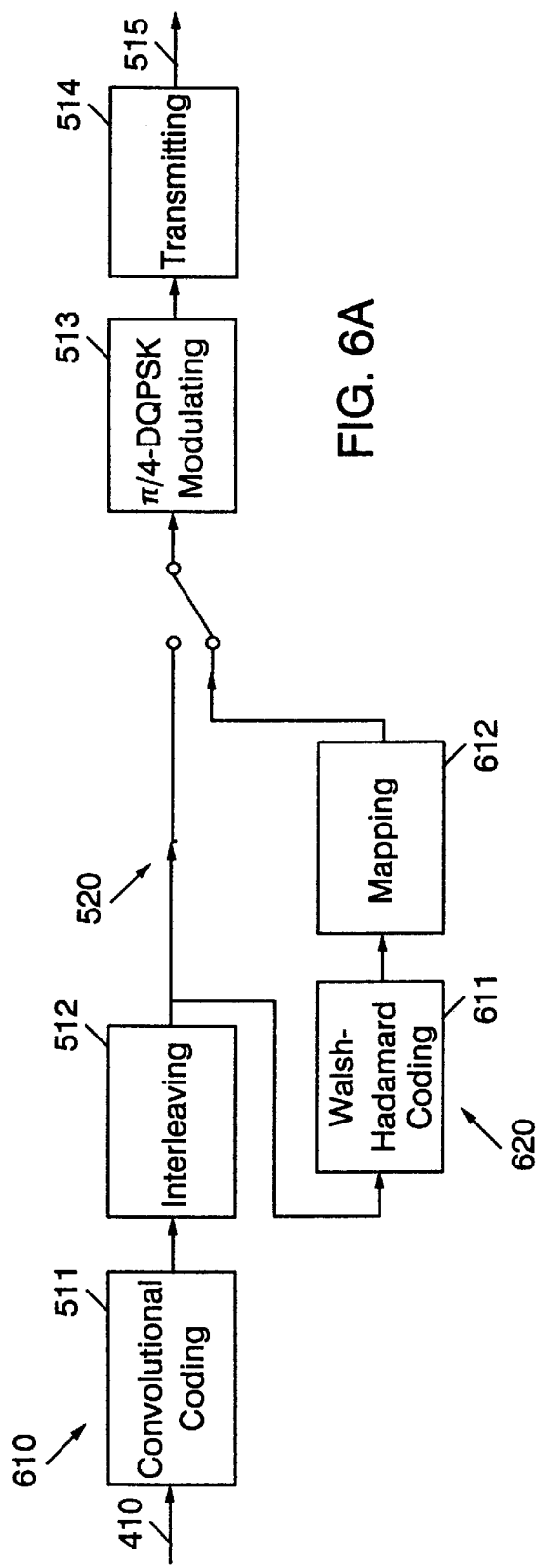
FIGS. 6A–B illustrate exemplary transmitting unit and receiving unit structures for a multi-service wireless communications system.
Figure 6B:
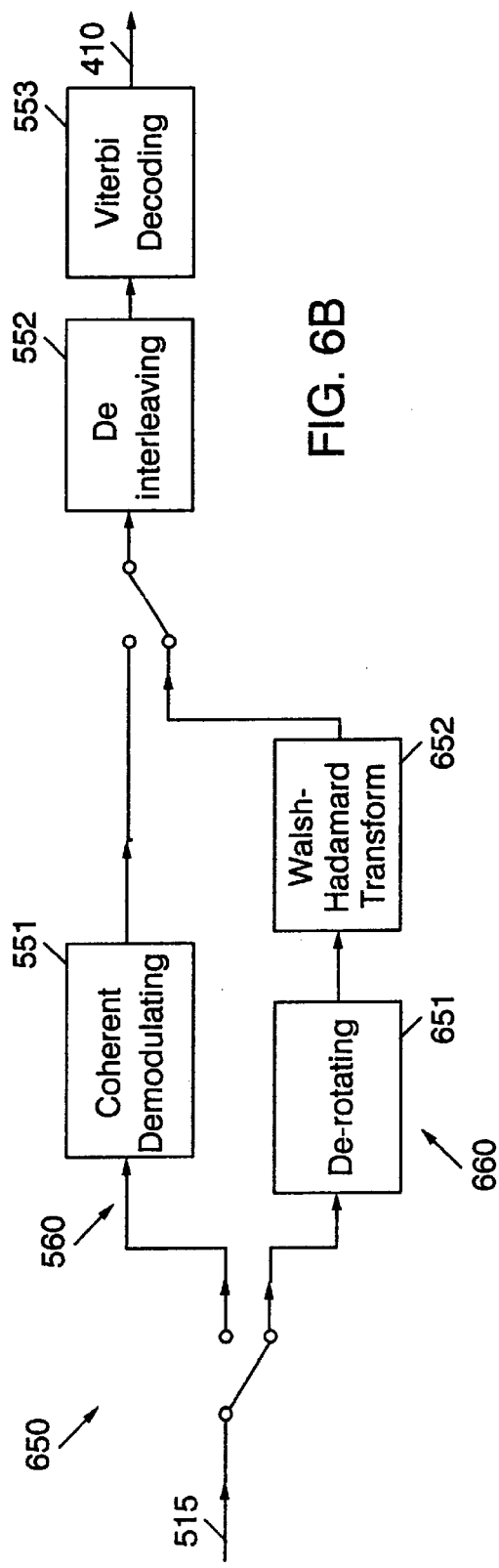

For example, as illustrated in FIGS. 6A and 6B, the additional coding may comprise an additional Walsh-Hadamard or other orthogonal or quasi-orthogonal code that introduces additional redundancy. An exemplary transmitting unit 610 includes convolutional coding means 511 and interleaving means 512. In a normal messaging channel 520, the interleaved and convolutionally encoded signal produced by the interleaving means 512 is supplied directly to a modulating means 513, e.g., a π/4-DQPSK modulator, for transmission by transmitting means 514. In a high-penetration channel 620, the interleaved and convolutionally encoded signal is additionally encoded by additional coding means 611, e.g., an encoder implementing a Walsh-Hadamard or other orthogonal or quasi-orthogonal code. The additionally encoded signal is mapped by mapping means 612 to produce a sequence that constrains the signal mapping of the modulating means 513 into a signal subset that produces a radio communications signal 515 that is amenable to non-coherent demodulation. An example of such a mapping is a bit repetition mapping that maps 4-level π/4-DQPSK modulation into a binary π/4-DBPSK modulation scheme, as described in a United States Patent Application entitled "High-Performance Half-Rate Coding Apparatus and Methodfor a TDM System," assigned to the assignee of the present application, filed Oct. 16, 1998, and incorporated by reference herein in its entirety as if the text is physically present.

As illustrated in FIG. 6B, a receiving unit 650 for receiving both normal and high penetration messages includes a coherent receiving branch 560 including means 551 for coherently demodulating a received radio communications signal 515, as well as a non-coherent receiving branch 660 including a de-rotating means 651 and a non-coherent demodulating means 652, e.g., a detector that implements a Walsh Hadamard transform. The output of the either the coherent receiving branch 560 or the non-coherent receiving branch 660 are then passed on to de-interleaving means 552 for de-interleaving and then to Viterbi decoding means 553 to recover a Data Link Layer frame 410' that represents an estimate of the originally transmitted Data Link Layer frame 410.

The additional coding preferably is an orthogonal or quasi-orthogonal code such as a Walsh-Hadamard or Nordstrom-Robinson code. The additional coding helps to raise the signal to noise ratio when communicating with a unit that is located in a disadvantaged location. The use of such a code with a mapping that maps the normal M-ary modulation into a binary modulation scheme that can be demodulated at the receiving terminal using non-coherent detection techniques. Coherent and non-coherent modulation techniques are well known to those skilled in the art. Several examples of these modulation techniques, as well as a discussion of Walsh-Hadamard and other codes may be found in *Digital Communications*, by Proakis, published by McGraw-Hill ($3_{rd}$ ed., 1995).

The use of noncoherent demodulation can avoid the need to perform channel estimation and tracking operations associated with coherent demodulation. Non-coherent demodulation is applied to an appropriately modulated signal, e.g., a differentially modulated, orthogonally modulated, quasi-orthogonally modulated, or similar signal. In a channel with significant delay spread, an appropriate demodulator is a so-called RAKE receiver, in which a received signal is correlated with each of the modulating sequences (e.g., the orthogonal, quasi-orthogonal, or other sequences used to produce the modulated signal), with different delays that model the delay spread of the channel. This and other demodulation techniques are described in the aforementioned text *Digital Communications*, by Proakis.

Those skilled in the art will appreciate that the components of the illustrated exemplary transmitting unit 610, i.e., the convolutional coding means 511, interleaving means 512, modulating means 513, and transmitting means 514, may comprise conventional transmission components typically found in base stations, mobile terminals or other similar communications apparatus. These components may include, for example, conventional transmitter circuits, antennas, processing circuits implemented in special purpose hardware such as an application-specific integrated circuit (ASIC) or in more general purpose hardware such as a digital signal processor (DSP), and the like. Similarly, elements of the receiving unit 650, i.e., the coherent demodulating means 551, de-rotating means 651, non-coherent demodulating means 652, de-interleaving means 552, and Viterbi decoding means 553, may comprise conventional receiving components commonly used in base stations, mobile terminals and the like. These components may include, for example, conventional antennas, mixers, signal and other processing circuits implemented in special purpose hardware such as an application-specific integrated circuit (ASIC) or in more general purpose hardware such as a digital signal processor (DSP) or microprocessor, and the like. Those skilled in the art will appreciate that, in general, the transmitting unit 610 and the receiving unit 650 may be implemented using special purpose analog or digital hardware, software running on general-purpose hardware, or combinations thereof.

Those skilled in the art will also appreciate that the structures of FIGS. 6A and 6B may be implemented in either base stations or subscriber terminals of a wireless communications system. For example, the normal and high-penetration messaging channels may be configured to communicate short messages from a base station to a subscriber unit, or to convey short message acknowledgements from a subscriber unit to a base station. More generally, the normal and high-penetration messaging channels may be used to provide voice and data messaging in either direction.

Figure 7:
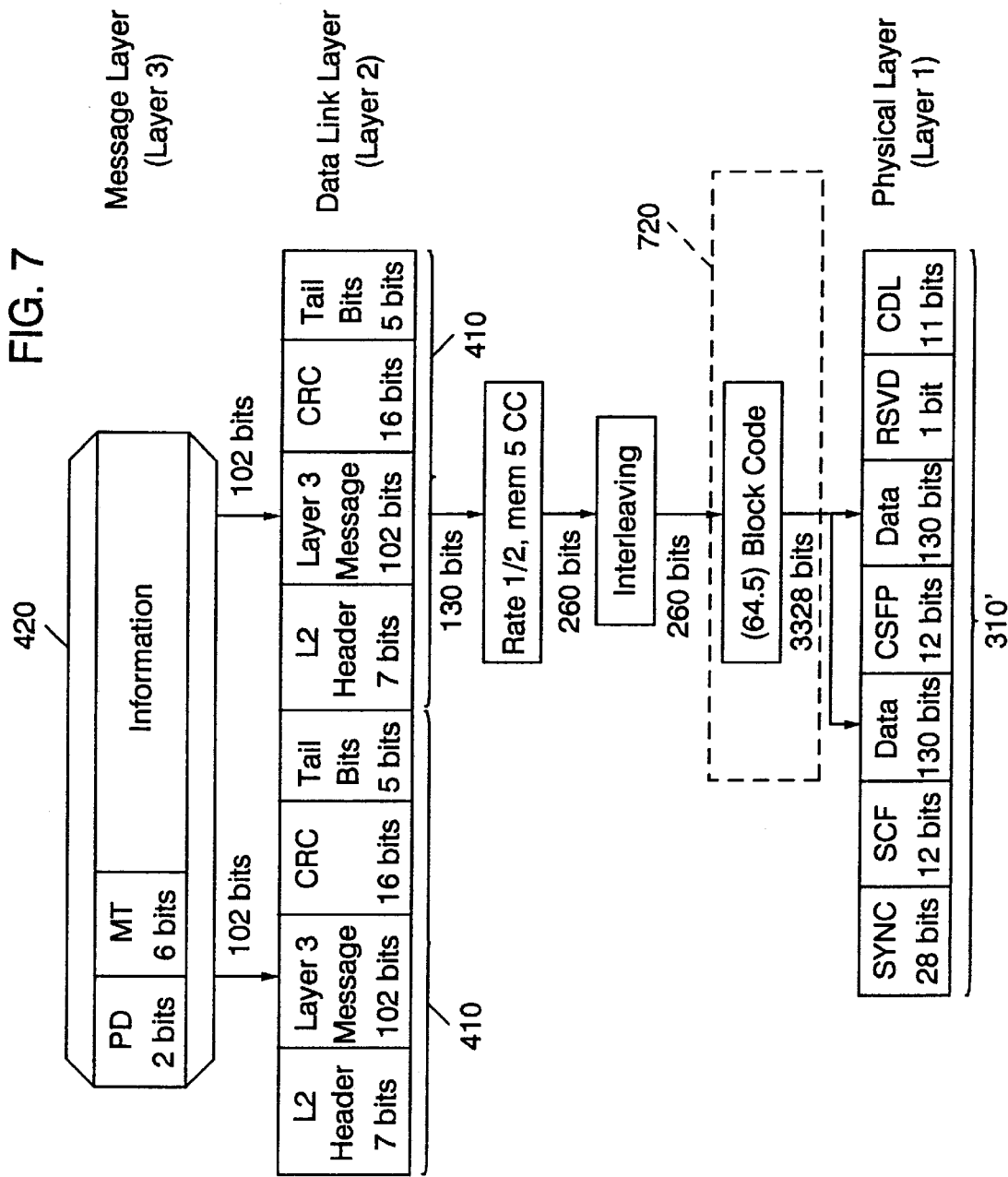
FIG. 7 illustrates an exemplary protocol stack for generating high penetration messages.

A protocol stack for implementing a high-penetration channel in an IS-136 compatible system is illustrated in FIG. 7. A Message Layer message 420 is formatted into a Data Link Layer frame 410 as described in reference to FIG. 5. In forming a modified high-penetration Physical Layer slot 720, however, an additional coding operation 710, here a (32,5) Walsh-Hadamard coding, is applied to increase redundancy in transmitting the information in the Message Layer message 420. The modified Physical Layer slot 310' includes a CDL field and a constant CSFP so that other units do not mistake the high-penetration slot 310' for a normal DCCH slot.

A different Super Frame structure may be used for the high-penetration messaging channel to enable the receiving unit to gain synchronization with the transmitting station.

Accordingly, as illustrated in FIG. 8, 4 slots 810 are used for synchronization bursts in each Super Frame SF. The synchronization slots 810 can be used for both channel acquisition and fine synchronization. The synchronization slots 810 may be irregularly spaced throughout the Super Frame SF so that the receiving unit can identify the first slot in the Super Frame SF.

As a result of the increased coding, the information of a Message Layer message transmitted using a high-penetration channel is spread out over a larger number of Physical Layer slots than in a conventional messaging channel. For example, in the modified IS-136 structure illustrated in FIGS. 7 and 8, a Data Link Layer frame is requires 13 Physical Layer slots, i.e., a Hyper Frame HF includes 13 Super Frames SF. This can introduce a delay in recovering the message in relation to a message transmitted on a conventional messaging channel, but does not require changing the sleep mode cycle of the receiving unit, as the unit still can be constrained to be active for one slot in each Super Frame SF.

Figure 9A:
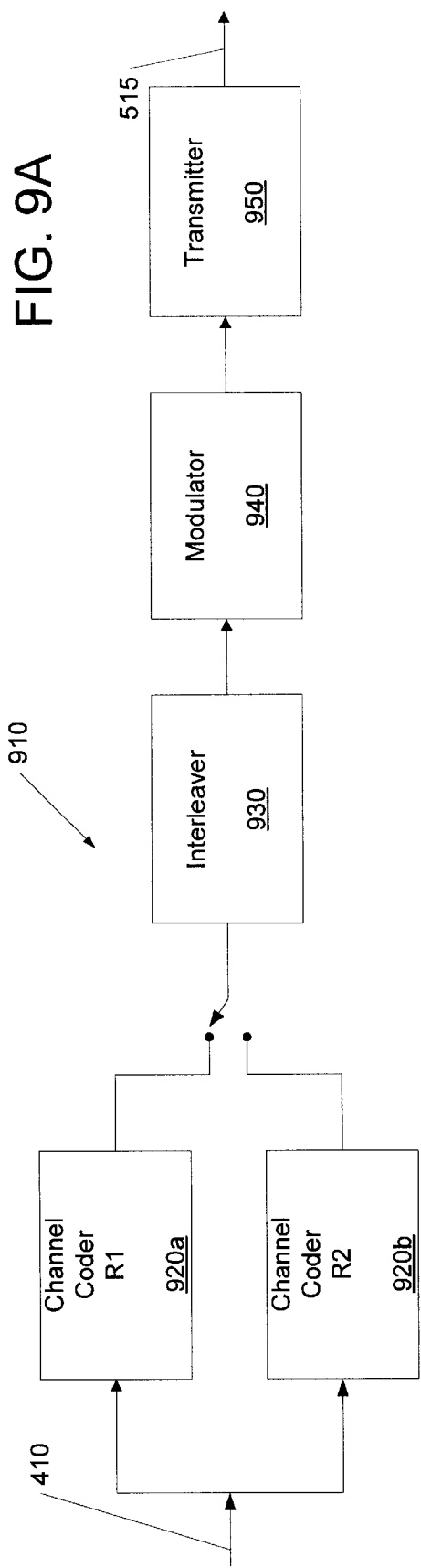
FIGS. 9A–B illustrate exemplary transmitting unit and receiving unit structures for a multi-service wireless communications system
Figure 9B:
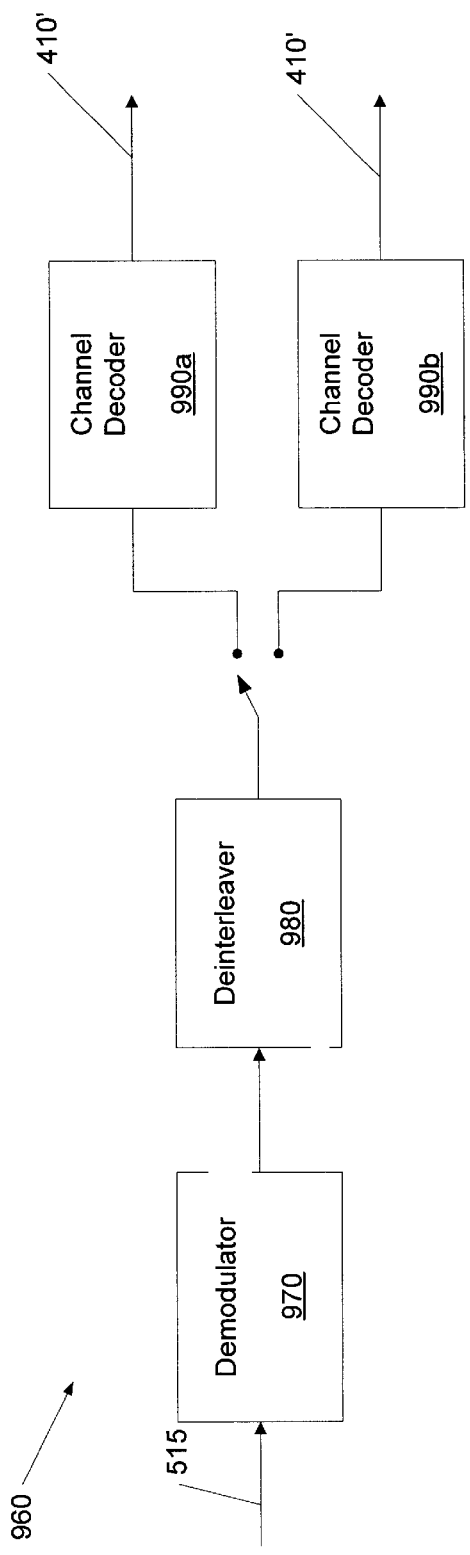

FIGS. 9A and 9B illustrate a general example of a communications system 900 having normal and high-penetration messaging capabilities. Referring to FIG. 9A, a transmitting unit 910 includes first and second channel coders 920a, 920b which receive a message 410 and encode it according to respective first and second codes having respective first and second coding rates R1, R2. As illustrated, the second coding rate R2 is less than the first coding rate R1, e.g., R2=¼ and R1=½, and thus the second channel coder 920b introduces less redundancy than the first channel coder 920a. A selected one of the first and second channel coders 920a, 920b is coupled to a modulator 940, perhaps after interleaving in an interleaver 930, producing a modulated signal. The modulated signal is transmitted as a radio communications signal 515 in a radio communications medium by a transmitter 950.

Referring to FIG. 9B, in a receiving unit 960, a demodulator 970 demodulates the transmitted signal, producing a demodulated signal. The demodulated signal is then deinterleaved in a deinterleaver 980, and passed on to an appropriate one of a first channel decoder 990a or a second channel decoder 990b, which decode the deinterleaved signal according to the respective first and second codes, producing an estimate 410' of the original message 410.

Figure 10:
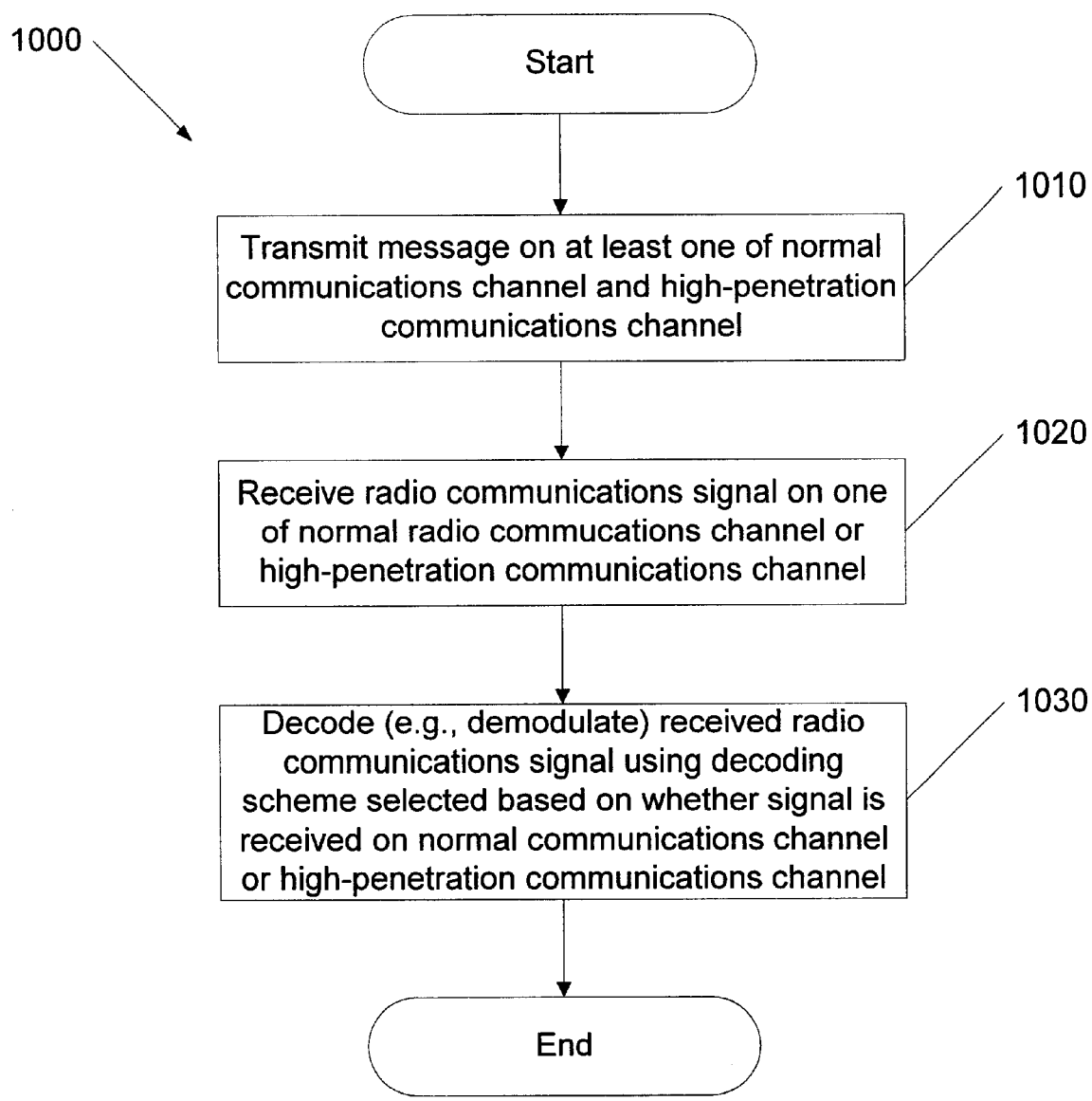
FIG. 10 illustrates exemplary operations for communicating messages over one of a normal communications channel and a high-penetration communications channel.

FIG. 10 illustrates exemplary operations 1000 for communicating messages using one of a normal messaging channel and a high-penetration messaging channel. A message is transmitted on one of normal communications channel or a high-penetration communications channel (Block 1010). A radio communications signal is received on one of the normal communications channel or the high-penetration communications channel (Block 1020). The received radio communications signal is demodulated using a demodulation scheme that is selected based on whether the radio communications signal is received on the normal communications channel or the high-penetration communications channel (Block 1030).

Those skilled in the art will appreciate that the operations of FIG. 10 can be implemented in a number of different ways, and that specific steps for performing these operations may depend on the type of message being communicated. For example, broadcast control messages, e.g., messages containing system identification and synchronization information, may be concurrently transmitted by a base station on both a normal communications channel and a high-penetration communications channel so that subscriber units can acquire the system using one of the channels. A subscriber unit attempting to acquire the system might first tune to the normal channel and, failing to successfully receive the transmitted control information on that channel, retune to the high-penetration channel to gain access. Alternatively, in a point-to-point messaging context, a base station might transmit a message first on a normal communications channel in an attempt to reach a particular subscriber unit, and then transmit the message on the high-penetration communications channel in the event that an acknowledgement of the message transmitted on the normal channel is not received within a predetermined time.

Other variations of the embodiments of FIGS. 6A–10 are possible. For example, the actual data, e.g., the actual "bits" sent over the alternative normal and high-penetration channels need not be identical. As used herein, "message" refers to a quantum of information content. This content may be represented in a number of different ways, depending on the channel being used; for instance, information content contained in a Message Layer message transmitted over a normal channel may be represented in a streamlined or compact format on a high-penetration channel to reduce the negative effects of message delay over the high-penetration channel. An example of such a technique could involve sending a set of control information via a logical channel defined in a normal channel such as an IS-136 DCCH under normal conditions and, for purposes of simply maintaining contact with a unit in a disadvantaged location, a smaller subset of the set of control channel information may be transmitted on a high-penetration channel.

Service-Based Charge Assignment

In broad terms, a wireless communications system such as the system described above offers a plurality of services, including "regular" services such as regular DAMPS messaging and "robust" higher-reliability services such as the high-penetration messaging described above. Such services may also be combined with other types of services, such as services that use increased bandwidth and/or transmit power to improve fidelity and/or other performance characteristics.

For purposes of the following discussion, three types of services are defined. "Standard" or "regular" services include services normally provided in wireless systems, e.g., standard voice, data or control channels. "Premium" services include services that use significantly increased bandwidth and/or transmit power, such as high-power short messaging systems along the line of the system described in the aforementioned U.S. patent application Ser. No. 08/719,282. "Robust" services include services that utilize substantially the same bandwidth and transmit power as standard services, but which provide increase reliability through such mechanisms as the increased coding used in the high-penetration messaging described above.

These types of services can be categorized according to both the spectral demand and non-spectral demand that they place on the wireless communications system. Spectral demand may include such things as bandwidth required to operate the service, both in terms of the frequency band occupied by the signals used to communicate according to the service and in terms of the bandwidth consumed by reduced frequency reuse and additional interference associated with increased transmit power. Non-spectral demand may include additional hardware, software and operational complexity introduced by the service that can lead to increased capital equipment and operational costs, such as the additional encoding and message delay associated with a robust service such as the high-penetration messaging service described above.

Generally speaking, "premium" services such as those described above tend to have higher associated spectral demand in comparison to corresponding standard services, while "robust" services typically have high associated non-spectral demand in comparison to corresponding standard services. For example, a high-bandwidth high fidelity voice service generally requires additional bandwidth that could otherwise could be used for other channels. A high-power messaging service may have higher associated spectral demand arising from increased interference caused by higher transmission power levels. As mentioned above, a high redundancy service such as the high-penetration messaging service described above generally requires additional system complexity. However, those skilled in the art will appreciate that "premium" services may also have additional associated non-spectral demand in comparison to corresponding standard services, and "robust" services may also have additional associated spectral demand in comparison to corresponding standard services.

The present invention arises from the realization that both spectral and non-spectral demand should be accounted for when apportioning costs to users of a wireless communications system. A more accurate and equitable apportionment of costs can be achieved within the context of the operation of the system by associating different tariffs or price schedules with different services in a manner such that a charge is assigned to user in a manner that is commensurate with the actual system resources used.

As described herein, charges are assigned to a user based on operational costs associated with the services utilized by the user. Those skilled in the art will appreciate that as used herein, "assigning a charge" in a communications system generally encompasses associating potential revenue of the communications system with a particular user. Accordingly, "assigning a charge" may encompass, for example, simply maintaining records, e.g., call records, that associate a particular user with a portion of the potential revenue stream of the system. Assigning a charge need not necessarily encompass the actual "billing" of the user. Those skilled in the art will also appreciate that charges associated with use may be expressed in monetary units or in non-monetary units.

Figure 2:
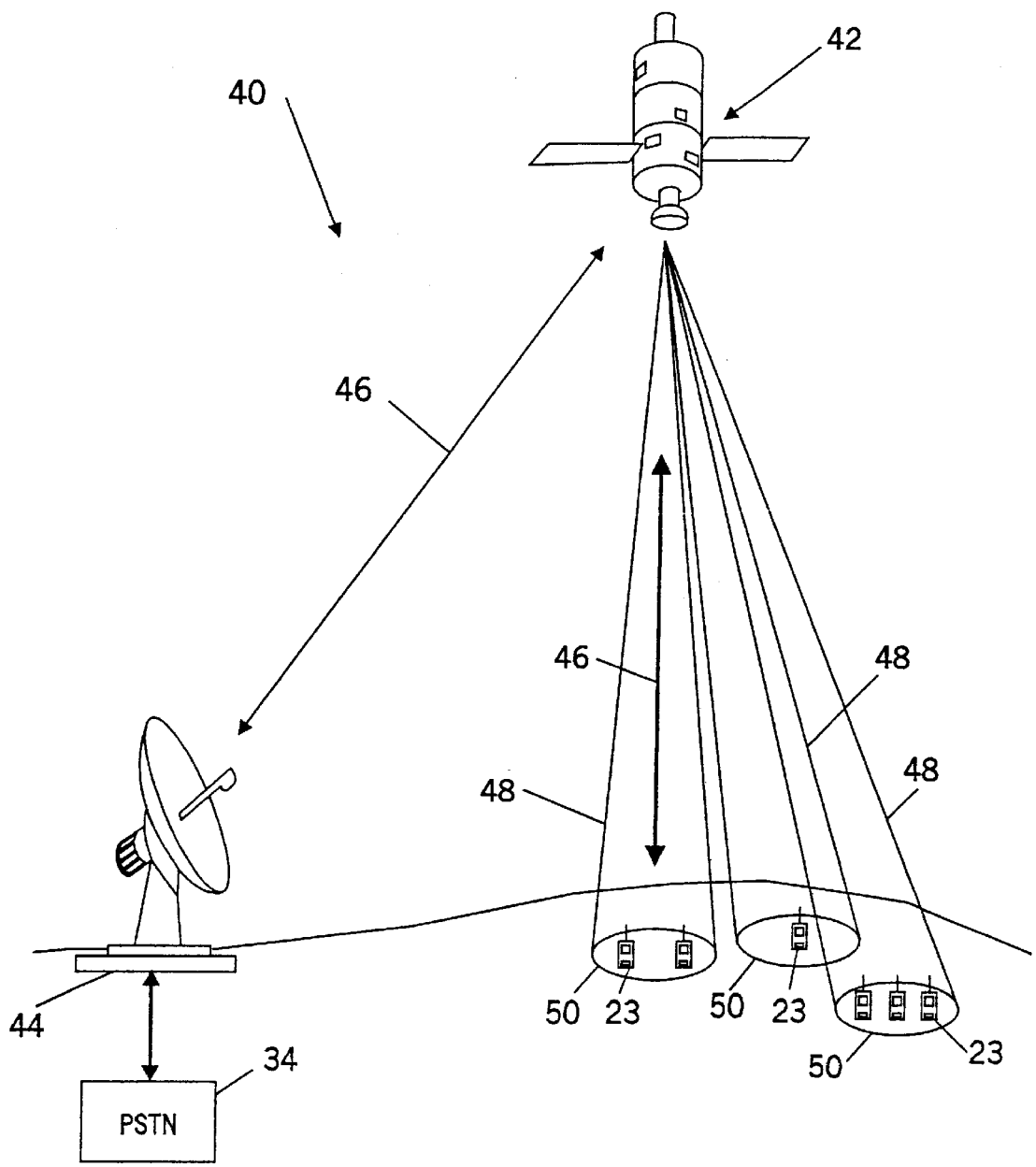
FIG. 2 illustrates a conventional satellite-based cellular radiotelephone communications system.
Figure 11:
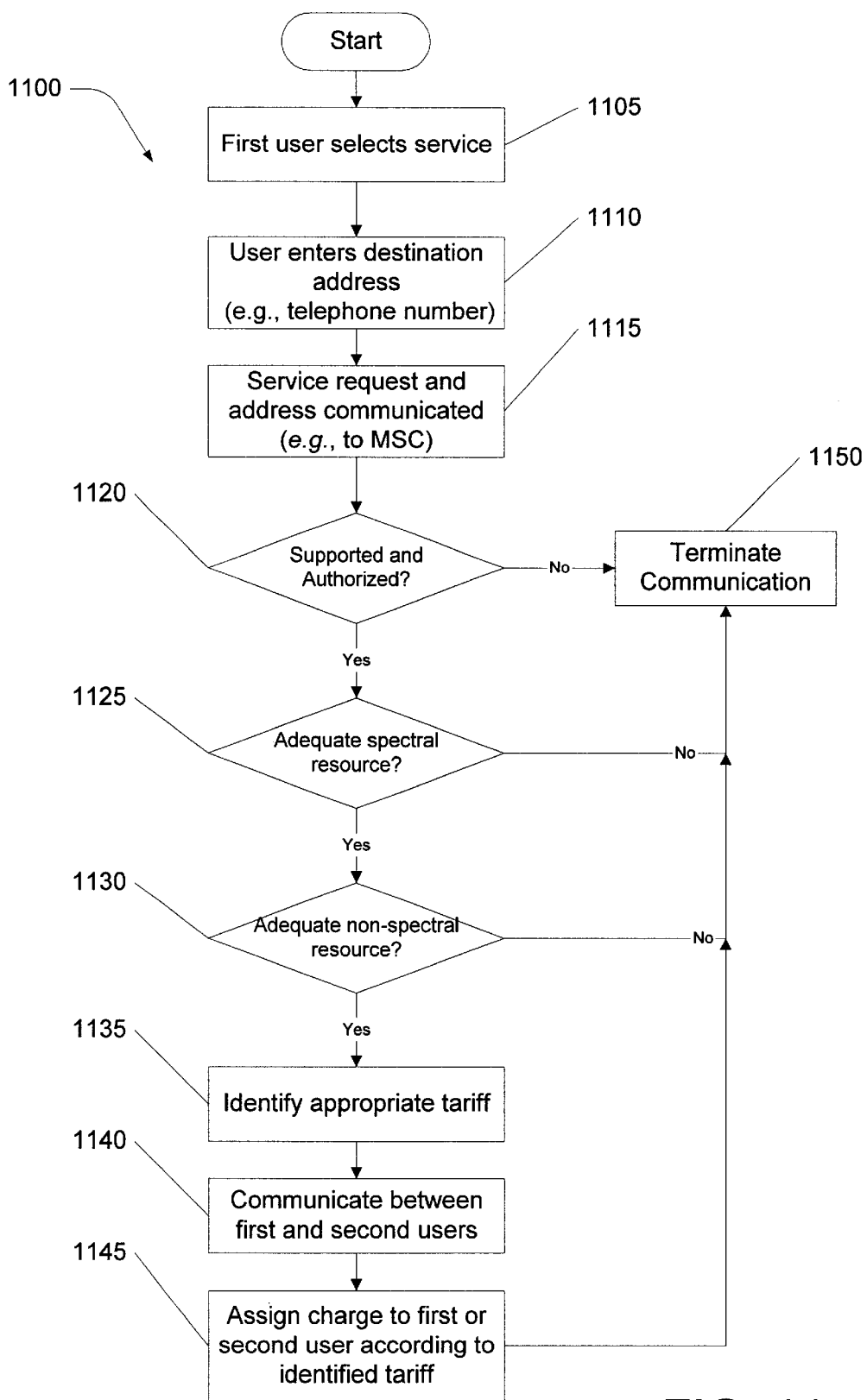
FIG. 11 illustrates exemplary operations for assigning communications charges according to aspects of the present invention.

FIG. 11 is a flowchart illustration of operations 1100 for communicating and assigning charges in a wireless communications system according to aspects of the present invention. It will be understood that blocks of the flowchart illustration, and combinations of blocks in the flowchart illustration, can be implemented by computer program instructions which may be loaded onto a computer or other programmable data processing apparatus to produce a machine such that the instructions which execute on the computer or other programmable data processing apparatus create means for implementing the functions specified in the flowchart block or blocks. For example, blocks of the flowchart illustration may be implemented as computer instructions that are loaded and executed at base stations, MTSO and/or mobile terminals of radiotelephone systems such as those illustrated in FIGS. 1 and 2. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions specified in the flowchart block or blocks.

Accordingly, blocks of the flowchart illustration support combinations of means for performing the specified functions and combinations of steps for performing the specified functions. It will also be understood that each block of the flowchart illustration, and combinations of blocks in the flowchart illustration, can be implemented by special purpose hardware-based computer systems which perform the specified functions or steps, or combinations of special purpose hardware and computer instructions.

It will also be understood that the blocks of the flowchart illustration may implemented using the messaging apparatus and methods illustrated in FIGS. 3–9. For example, functions illustrated by the blocks of the flowchart illustration that relate to communicating over robust, high-penetration messaging channels may be performed using the apparatus and methods of FIGS. 6A–10.

Referring to FIG. 11, a user, e.g., a user at a mobile terminal, selects a desired service, e.g., "regular" service, a "robust" service or a "premium" service (Block 1105). Selection may occur, for example, by selecting from a menu displayed at the user's terminal. The user then enters a destination address, e.g., the telephone number or electronic mail address of a second user at another mobile terminal, wireline telephone, or the like (Block 1110). The service request and destination address are conveyed to the system, for example, via messages transmitted to a base station via a radio communications signal or by wireline messages transmitted to a MTSO via the PSTN (Block 1115). The system then verifies that the selected service is supported and that the sending and/or receiving unit is authorized to use the selected service (Block 1120). For example, the system may check to see if the sending or receiving unit is currently camped on a base station that supports the selected service. If the service is not supported or authorized, the system may terminate the communication (Block 1150).

If the service is supported and authorized, the system next checks to see if adequate spectral and non-spectral resources are available to establish communication between the sending unit and the receiving unit according to the selected service (Blocks 1125, 1130). For example, the system may check to determine if adequate channel capacity is available to serve a higher-bandwidth service, or if the destination unit is currently camped onto a base station that is capable of supporting a robust service such as the high-penetration messaging service described above. If adequate resources are not present, the communication is terminated (Block 1150).

If adequate resources are present, the system identifies an appropriate tariff, e.g., a per minute or per message rate, fixed surcharge or the like, associated with the selected service (Block 1135). The system then establishes communications between the first and second users according to the selected service (Block 1135) and assigns a charge to one of the users according to the identified tariff (Block 1145).

The prices of a respective tariff associated with a respective service are preferably proportional to the amount of spectral and non-spectral demand associated with the service. For example, a prices associated with a higher-spectral demand service such as a high-power service preferably are greater than the prices associated with a corresponding lower spectral demand standard service that uses substantially the same amount of non-spectral resources as the high-power service. Similarly, a tariff associated with a robust service such as a high-redundancy messaging service specifies higher prices than the tariff associated with a lower non-spectral demand standard service that uses substantially the same spectral resources as the robust service.

Several variations to the exemplary operations of FIG. 11 may be performed within the scope of the present invention. Selection of a service may be implemented in several other ways than by user selection. For example, the receiving user may establish a "default" service that is to be utilized in response to a request to contact the receiving user. Alternatively, the system may query the sending or receiving unit to determine the type of service desired.

Instead of terminating communication when a service is not supported or authorized, the system may revert to another default standard, robust or premium service for that is supported and authorized. Similarly, when the spectral or non-spectral resources needed to communicate a selected service are unavailable, the system may revert to a default system for which adequate resources are available.

Charge assignment according to the present invention can be combined with more conventional cost-assignment metrics, such as message duration, message size, time of day and the like. For example, a charge may be determined by scaling message duration by a multiplier that is selected according to the type of service used. Service-based charge assignment according to the present invention may also be implemented, for example, in the form of surcharges that are assigned based on the service used to provide communications.

The order of the exemplary operations described above may also be varied. For example, the system may first determine if the needed spectral resources are available before checking for support or user authorization. The order of such steps may be determined, for example, by the particular architecture of the wireless communications system. For example, the system may be able to verify system resource availability upon receiving a request to communicate from a sending unit, but may be unable to determine whether a particular service is supported or authorized for a particular receiving unit until the receiving unit is actually contacted.

Those skilled in the art will appreciate that although the present invention is illustrated in the context of a high-penetration messaging system such as illustrated in FIGS. 6A–10, the present invention is not limited to use with the illustrated embodiments of FIGS. 6A–10. The methods and apparatus of the present invention are also applicable to the communication of other content than short messages; for example, similar techniques could be used to communicate short message acknowledgement, voice and data. The present invention is also applicable to systems providing "premium" messaging services, such as high-power short message services. In addition, the present invention is also applicable to systems providing services that represent a hybrid combination of the "robust" and "premium" characteristics described above, for example, systems that offer services with both increased power and redundancy that utilize both increase spectral and non-spectral resources.

In the drawings and specification, there have been disclosed typical preferred embodiments of the invention and, although specific terms are employed, they are used in a generic and descriptive sense only and not for purposes of limitation, the scope of the invention being set forth in the following claims.

That which is claimed is:

1. In a wireless communications system, a method of operating comprising the steps of:

identifying a service of a plurality of services offered by the wireless communications system, a respective one of the plurality of services employing a respective communications channel having a respective error correction coding redundancy level;

communicating a message according to the identified service; and assigning a charge for communication of the message according to the identified service commensurate with the error correction coding redundancy level of the associated communications channel.

2. A method according to claim 1, wherein said step of identifying comprises the step of identifying a predetermined service associated with an intended recipient of the message.

3. A method according to claim 1, wherein said step of communicating comprises the step of communicating a message according to the identified service if use of the identified service is authorized.

4. A method according to claim 1, wherein the plurality of services comprises a first service having a first bandwidth demand associated therewith and a second service having a second bandwidth demand associated therewith, wherein the second bandwidth demand is greater than the first bandwidth demand.

5. A method according to claim 1, wherein the plurality of services comprises a first service having a first non-bandwidth demand associated therewith and a second service having a second non-bandwidth demand associated therewith, wherein the second non-bandwidth demand is greater than the first non-bandwidth demand.

6. A method according to claim 5, wherein the first service has first transmit power level associated therewith and wherein the second service has a second transmit power level associated therewith, the second transmit power level greater than the first transmit power level.

7. A method according to claim 1, wherein said step of assigning a charge comprises the step of assigning a charge to one of a source of the communicated message and a recipient of the communicated message.

8. A method according to claim 1, wherein said step of communicating is preceded by the step of determining if system resources sufficient to meet a system resource demand associated with the identified service are present, and wherein said step of communicating comprises the step of communicating a message according to the identified service if sufficient system resources are present.

9. A method according to claim 1, wherein said step of assigning a charge is preceded by the step of identifying a tariff associated with the identified service, and wherein said step of assigning a charge comprises the step of assigning a charge for communication of the message according to the identified tariff.

10. In a wireless communications system, an apparatus comprising:

means for identifying a service of the plurality of services offered by the wireless communications system, a respective one of the plurality of services employing a respective communications channel having a respective error correction coding redundancy level;

means, responsive to said means for identifying, for communicating a message according to the identified service; and means, responsive to said means for communicating, for assigning a charge for communication of the message according to the identified service commensurate with the error correction coding redundancy level of the associated communications channel.

11. An apparatus according to claim 10, wherein said means for identifying comprises means for identifying a service in response to a user request to communicate a message.

12. An apparatus according to claim 11, wherein said means for identifying comprises means for identifying a predetermined service associated with an intended recipient of the message.

13. An apparatus according to claim 10, wherein said means for communicating comprises means for communicating a message according to the identified service if use of the identified service is authorized.

14. An apparatus according to claim 10, wherein the plurality of services comprises a first service having a first bandwidth demand associated therewith and a second service having a second bandwidth demand associated therewith, wherein the second bandwidth demand is greater than the first bandwidth demand.

15. An apparatus according to claim 10, wherein the plurality of services comprises a first service having a first non-bandwidth demand associated therewith and a second service having a second non-bandwidth demand associated therewith, wherein the second non-bandwidth demand is greater than the first non-bandwidth demand.

16. An apparatus according to claim 15, wherein the first service has first transmit power level associated therewith and wherein the second service has a second transmit power level associated therewith, the second transmit power level greater than the first transmit power level.

17. An apparatus according to claim 10, wherein said means for assigning a charge comprises means for assigning a charge to one of a source of the communicated message and a recipient of the communicated message.

18. An apparatus according to claim 10, further comprising means for determining if system resources sufficient to meet a system resource demand associated with the identified service are present, and wherein said means for communicating comprises means for communicating a message according to the identified service if sufficient system resources are present.

19. An apparatus according to claim 10, further comprising means for identifying a tariff associated with the identified service, and wherein said means for assigning a charge comprises means for assigning a charge for communication of the message according to the identified tariff.

20. A method of operating a wireless communications system, the method comprising:

assigning respective different charges for respective ones of a first service that provides a first error correction coding and a second service that provides a combination of the first error correction coding and a second error correction coding, wherein the respective different charges assigned to communication using the first and second charges are commensurate with the respective error correction codings provided by the respective services.

21. A method according to claim 20, further comprising:

determining if system resources sufficient to meet a system associated with one of the first and second services are present; and communicating a message using the one of the first and second services if sufficient system resources are present.

22. A method according to claim 20, further comprising:

determining whether use of one of the first and second services is authorized; and communicating a message according to the one of the first and second services if use of the one of the first and second services is authorized.

* * * * *